US012505310B2

(12) United States Patent
Policastro et al.

(10) Patent No.: US 12,505,310 B2
(45) Date of Patent: Dec. 23, 2025

(54) DIFFERENTIAL ATTENTION FOR NEURAL NETWORKS

(71) Applicant: THE BANK OF NEW YORK MELLON, New York, NY (US)

(72) Inventors: Christopher Policastro, Wynnewood, PA (US); Yikai Feng, New York, NY (US); Abhinav Prasad, Edison, NJ (US)

(73) Assignee: THE BANK OF NEW YORK MELLON, New York, NY (US)

( * ) Notice: Subject to any disclaimer, the term of this patent is extended or adjusted under 35 U.S.C. 154(b) by 322 days.

(21) Appl. No.: 18/307,466

(22) Filed: Apr. 26, 2023

(65) Prior Publication Data

US 2024/0362420 A1    Oct. 31, 2024

(51) Int. Cl.
  *G06F 40/40*   (2020.01)
  *G06F 40/205*  (2020.01)
  *G06F 40/284*  (2020.01)

(52) U.S. Cl.
  CPC .......... *G06F 40/40* (2020.01); *G06F 40/205* (2020.01); *G06F 40/284* (2020.01)

(58) Field of Classification Search
  CPC ....... G06F 40/40; G06F 40/284; G06F 40/205
  See application file for complete search history.

(56) References Cited

U.S. PATENT DOCUMENTS

| | | | |
|---|---|---|---|
| 11,042,796 B2 * | 6/2021 | Hashimoto | G06N 3/063 |
| 12,175,222 B1 * | 12/2024 | Benfield | G06N 3/048 |
| 12,290,230 B2 * | 5/2025 | Mai | H04L 25/0224 |
| 2006/0190225 A1 * | 8/2006 | Brand | G06F 16/9535 703/2 |
| 2015/0261830 A1 * | 9/2015 | Capdefier | G06F 16/2465 707/776 |
| 2017/0124782 A1 * | 5/2017 | Amirapu | G05B 23/024 |
| 2020/0110988 A1 * | 4/2020 | Wang | G06N 3/063 |
| 2021/0064620 A1 * | 3/2021 | Namaki | G06F 16/90324 |
| 2021/0241079 A1 * | 8/2021 | Mills | G06F 7/544 |
| 2023/0115185 A1 * | 4/2023 | Huang | G06N 3/0475 |

(Continued)

OTHER PUBLICATIONS

Szekeley et al., Brownian distance covariance, The Annals of Applied Statistics, vol. 3, No. 4, pp. 1236-1265, 2009 (Year: 2009).*

(Continued)

*Primary Examiner* — Bhavesh M Mehta
*Assistant Examiner* — Eunice Lee
(74) *Attorney, Agent, or Firm* — Pillsbury Winthrop Shaw Pittman, LLP (57) ABSTRACT

The disclosure relates to systems and methods of improved attention for neural networks. A system may access a first array of entries and a second array of entries, wherein the first array represents a first word embedding generated from one or more first characters of an input and the second array represents a second word embedding from the one or more second characters of the input. A system may generate at least a first difference matrix based on the first array and at least a second difference matrix based on the second array. A system may determine a difference value based on vector based at least in part on the difference value. A system may provide the context vector to subsequent layers of a neural network.

20 Claims, 8 Drawing Sheets

(56) References Cited

U.S. PATENT DOCUMENTS

2023/0359696 A1* 11/2023 Xin .................. G06F 17/16
2023/0367975 A1* 11/2023 Zhang ................ G06F 40/51
2024/0232664 A1* 7/2024 De .................... G06F 40/30

OTHER PUBLICATIONS

Dzmitry Bahdanau et al., "Neural Machine Translation by Jointly Learning to Align and Translate", Conference paper at ICLR 2015, pp. 1-15.
Andrea Galassi et al., "Attention in Natural Language Processing", IEEE Transactions on Neural Networks and Learning Systems, vol. 32, No. 10, Oct. 2021, pp. 4291-4307.
Alex Graves et al., "Neural Turing Machines", Google DeepMind, London UK, Dec. 2014, 26 pgs.
Minh-Thang Luong et al., "Effective Approaches to Attention-based Neural Machine Translation", Computer Science Department, Stanford University, Stanford CA, Sep. 2015, 11 pgs.
Gabor J. Szekely et al., "Measuring and Testing Dependence by Correlation of Distances", The Annals of Statistics, 2007, vol. 35, No. 6, pp. 2769-2794.
Ashish Vaswani et al., "Attention is All You Need", NeurIPS, 2017, 15 pgs.

* cited by examiner

DIFFERENTIAL ATTENTION FOR NEURAL NETWORKS

BACKGROUND

Attention is an input processing technique that enhances certain portions of input data for analysis by a neural network. For example, attention may enable the neural network to focus on certain elements of an input sequence based on the context of those elements in the input sequence. In this way, the neural network may pay more attention to important parts of the input data while paying less attention to other parts.

Attention has revolutionized deep learning systems and has far-reaching applications in natural language processing, computer vision, and other deep learning systems. For example, attention enables focus on important words or phrases in a sentence to discern proper word ordering across different languages, resulting in better machine translation of the sentence into a target language. Attention can also be extended to other deep learning applications in natural language processing such as for text sentiment analysis, text summarization, and others. In computer vision, attention may enable focus on certain portions of images to improve image analysis in neural networks.

Although attention improves deep learning systems in various applications, issues can arise from the use of attention. For example, attention may not perform well on complex or non-linear input data. A single attention component might lose information from the data. Thus, increasingly complex or non-linear input data may require multiple attention components, referred to as multi-head attention. However the additional parameters to learn increases training time and computational resource usage. Loss of data may make neural network modeling less sensitive to important data and/or more sensitive to unimportant data. These and other issues may exist in systems that use attention for neural networks.

SUMMARY

Various systems and methods may address the foregoing and other problems. For example, a system may implement improved attention architectures that address issues relating to data complexity and non-linearity. The improved attention architectures may address data loss that can occur in attention mechanisms. In one example, an improved attention architecture may use distance covariance on embeddings to generate context vectors that are used to train or execute neural networks. In another example, an improved attention architecture may use distance correlation on embeddings to generate context vectors that are used to train neural networks.

Neural networks may be trained to detect increasingly complex data patterns in noisy data or handle large data inputs through larger models with more layers that learn more parameters. However, doing so not only increases training time, but also computational resource usage. To address complex data without increasing the size of the model, the improved attention architectures may scale up the input data instead of scaling up the model. For example, input data may be processed through an improved attention architecture to expand the input data to enhance the ability to detect relationships. Differences in the expanded input data may be determined by the improved attention architectures so that more information may be learned by the neural network. Thus, the improved attention architectures may enhance sensitivity of complex data patterns that may otherwise be lost or not accounted for in more traditional attention and neural network architectures. The improved attention architectures respectively incorporate what is referred to herein as "Simple Differential Attention" (SDA) and "Differential Attention" (DA).

The SDA and DA architectures may each operate on embeddings to generate a context vector that is based on contextual information. The embeddings will be referred to herein as "arrays" since they may be arrays of numbers that represent elements in the input data. The input data may include an input sequence such as a sentence, in which case the embeddings are word embeddings that represent the text or words in a sentence. The input data may be other types of data, such as images, in which case the embeddings may represent image elements such as pixels, voxels, or other image elements in an image. The particular type of embeddings will depend on the implementation of the neural network, such as whether the neural network is trained for text analysis, computer vision (image analysis), and/or other implementations.

The SDA architecture may include a tile and/or repeat operation on each array. The tile and/or repeat may be used to determine pairwise differences on flattened arrays. The tile operation may concatenate arrays. For example, in an array [1,2,3], tiling twice would result in the array: [1,2,3, 1,2,3]. The repeat operation may duplicate values. For example, in the array [6,7,8] then repeating twice would result in the array: [6,6,7,7,8,8]. The tile and/or repeat operations may facilitate efficient pairwise comparisons without reshaping the input arrays. The pairwise comparisons may facilitate the prevention of information loss in the attention mechanism due to taking difference of differences rather than differences between the input arrays.

The SDA architecture may include a pairwise difference operation between at least a pair of arrays. This pairwise difference calculation may be based on a difference between each element of each array, which may have been tiled and repeated. The SDA architecture may include a difference value operation in which a norm such as an L2 norm is determined for the pair of arrays. The difference value operation may involve other types of norms such as an $L_P$ norm, in which P is an integer that depends on the particular implementation. The pairwise differences and the L2 norm may detect more complex data relationships based on the expanded arrays. Based on the operations of the SDA architecture to expand and generate differences between input arrays (embeddings), a context vector may be generated using a conceptual query-key-value framework used for attention.

The DA architecture may include a broadcast operation (also referred to as "broadcasting") on each array. Broadcasting may reshape arrays for various reasons, such as to make a smaller array the same shape as a larger array. In this case, each array may be broadcasted with respect to a paired array to stretch each array across dimensions to result in larger datasets for pairwise differences. This stretching permits appropriate entries to come together in the pairwise differences to further improve attention sensitivity.

The DA architecture may include a pairwise difference and difference value operation between a pair of arrays after broadcasting. Determining the pairwise difference and the difference value such as an L2 norm or other metric may be performed in the same way as described in the SDA architecture.

The DA architecture may include a double center operation, which may also be referred to herein as "double centering." When comparing single axis arrays such as: [1,2,3], a centering operation may be performed in which the arrays are centered. To do so, the mean value of the array elements is subtracted from each element, making the array more comparable to other arrays. In particular, large and small numbers may be avoided from comparison. Because the arrays in the DA architecture may be transformed into multi-axes matrices, centering will occur in both (or more) axes. As such, centering for the DA architecture is referred to as a double center operation.

The DA architecture may include a flatten operation. A multi-dimensional (such as 2-dimensional) array may be flattened into a lower-dimensional (such as 1-dimensional) array. Likewise, a paired multi-dimensional (such as 2-dimensional) array may be flattened into a lower-dimensional (such as 1-dimensional) array. The dot product on the flattened arrays may be generated. Based on the operations of the DA architecture to expand and generate differences between input arrays (embeddings), a context vector may be generated using the conceptual query-key-value framework.

BRIEF DESCRIPTION OF THE DRAWINGS

Features of the present disclosure may be illustrated by way of example and not limited in the following figure(s), in which like numerals indicate like elements, in which.

DETAILED DESCRIPTION

The Transformer model is one of the benchmark models for Natural Language Processing tasks like text classification. Transformers differ from other architectures like Recurrent Neural Networks. While Recurrent Neural Networks process the data in order, Transformers process the data out of order. Transformers incorporate the order through the position of data in the sequence. For sequences of text, Transformers take a sentence along with the position of words in the sentence. The numerical representation of the words and position of words form two channels in the input array. Since the attention mechanism may not relate queries and keys with multiple channels, the Transformer collapses two channels into one channel through addition.

Addition may result in information loss across the channels. If the input has more than two channels, then the loss of information is worse for multiple numerical representations of words. Researchers have developed different ways to relate queries and keys across channels. However, practitioners tend to use two common operations: multiplicative attention with dot product and context-based attention with cosine similarity. Covariance and Correlation may be able to detect simple relationships between queries and keys. However, Covariance and Correlation may be unable to detect complex relationships. Nonlinear transformations in neural networks lead to nonlinear relationships in the data. Noisy data lead to even more complex relationships. Distance Covariance and Distance Correlation in respective SDA and DA architectures may detect these relationships.

Figure 1:
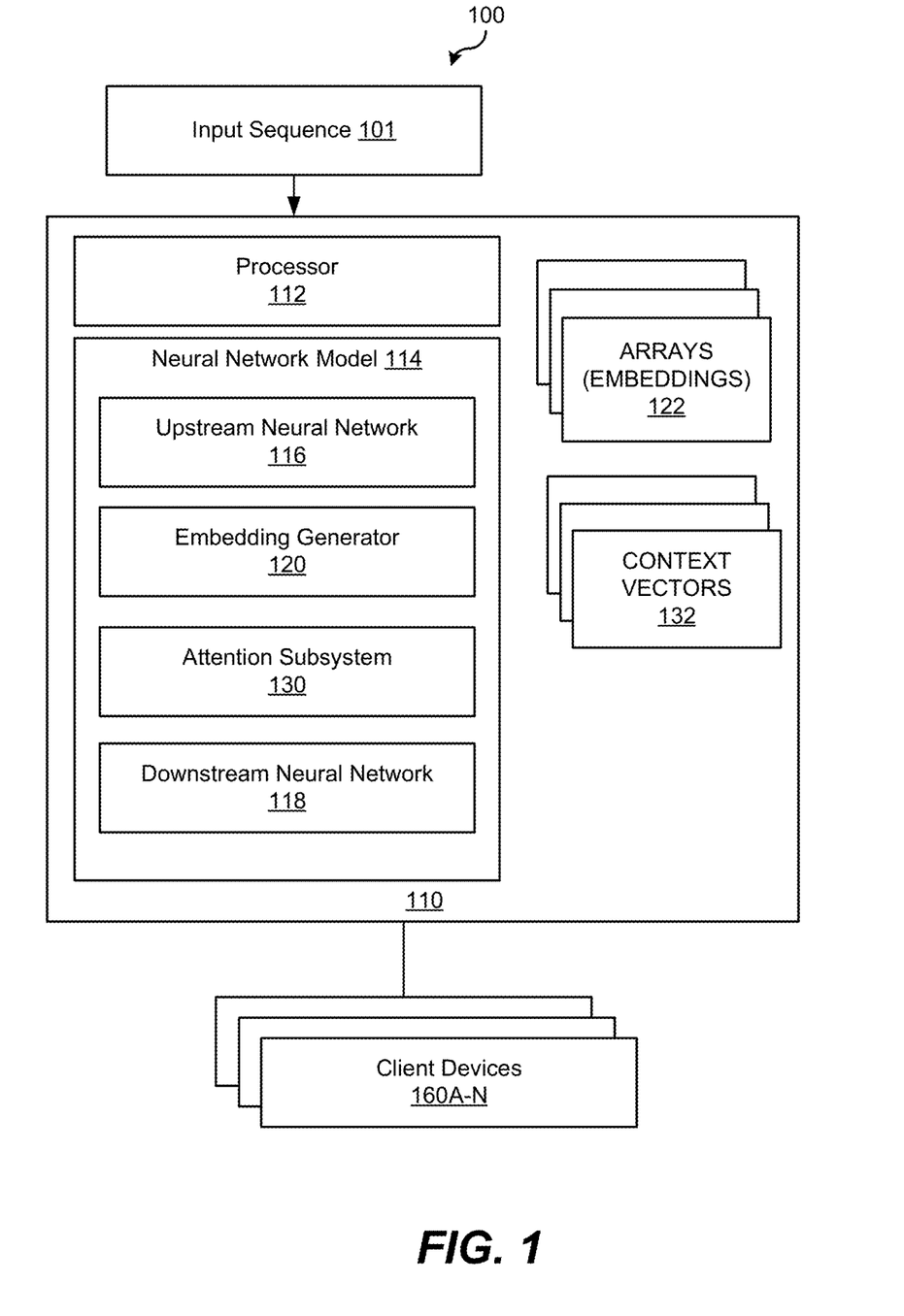
FIG. 1 illustrates an example of a system of improved attention for neural networks.

FIG. 1 illustrates an example of a system 100 of improved attention for neural networks. The system 100 may include a computer system 110 and client devices 160. The computer system 110 may include a processor 112. The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some embodiments, processor 112 may comprise a plurality of processing units. These processing units may be physically located within the same device, or processor 112 may represent processing functionality of a plurality of devices operating in coordination.

Processor 112 may be configured to execute or implement one or more of the features of a neural network model 114 by software; hardware; firmware; some combination of software, hardware, and/or firmware; and/or other mechanisms for configuring processing capabilities on processor 112. It should be appreciated that although features of the neural network model 114 are illustrated in FIG. 1 as being co-located in the computer system 110, one or more of the components or features of the neural network model 114 may be located remotely from the other components or features. The description of the functionality provided by the different components or features of 114 described below is for illustrative purposes, and is not intended to be limiting, as any of the components or features of 114 may provide more or less functionality than is described, which is not to imply that other descriptions are limiting. For example, one or more of the components or features of 114 may be eliminated, and some or all of its functionality may be provided by others of the components or features of 114, again which is not to imply that other descriptions are limiting. As another example, processor 112 may include one or more additional components that may perform some or all of the functionality attributed below to one of the components or features of 114.

The processor 112 may be programmed to execute one or more computer program components. The computer program components or features may include software programs and/or algorithms coded and/or otherwise embedded in the processor 112, for example. The one or more computer program components or features may include features of the neural network model 114.

The neural network model 114 may include an upstream neural network 116, an embedding generator 120, an attention subsystem 130, and a downstream neural network 118. The upstream neural network 116 may include one or more layers of a neural network. In a feed-forward neural network, for example, the upstream neural network 116 may generate an output based on an input and provide the output to a downstream layer.

The embedding generator 120 may access an input sequence 101. The input sequence 101 is a sequence of elements, in which each element is discernible from one another based on its position in the sequence. Examples of an input sequence 101 may include, without limitation, a sentence having characters such as text that form a sequence of words; an image having a sequence of pixels, voxels, or other image elements that form a bitmap; and/or other input data that have discernible elements having a position in the input data. Examples described herein will refer to a sequence of characters or words for illustrative convenience. However, the illustrated examples may be applied to images or other types of input data based on the disclosure herein.

The embedding generator 120 may pre-process the input sequence 101 to generate an input for deep learning. For example, the embedding generator 120 may vectorize the input sequence 101 to generate a plurality of arrays 122. The term "vectorize" refers to transforming input data into a quantitative, such as numeric, value.

Models for text processing are used to solve technical problems involving human language. These models may convert text into numbers (generate text embeddings). For an input sentence, each array 122 may represent a text embedding for a word in the input sentence. A text embedding is a numeric representation of text in the input sentence. The embedding generator 120 may generate the text embeddings using various text embedding techniques such as, without limitation, Term Frequency-Inverse Document Frequency (TD-IDF), WORD2VEC, One-Hot Encoding, Bag-of-words, and/or other text embedding techniques.

Some words in the input sequence 101 may not be meaningful or as important as others. For example, articles such as "a" or "the" may not be as important keywords that convey useful information. In TF-IDF, a resulting embedding may be based on a count of the number of occurrences of each word in a document. The count is weighted up or down depending on the commonness of the word across all documents in the corpus. The words "a" and "the" may be weighted down due to their commonness. Thus, in this case, neural networks should be focused away from these words and onto more important keywords.

Attention may be used in text processing to learn these important keywords for network networks. Put another way, attention may add contextual information to embeddings to generate context-aware embeddings. The context captures interactions between words. Then the context modulates the text embedding to incorporate these cross-word interactions.

Figure 2:
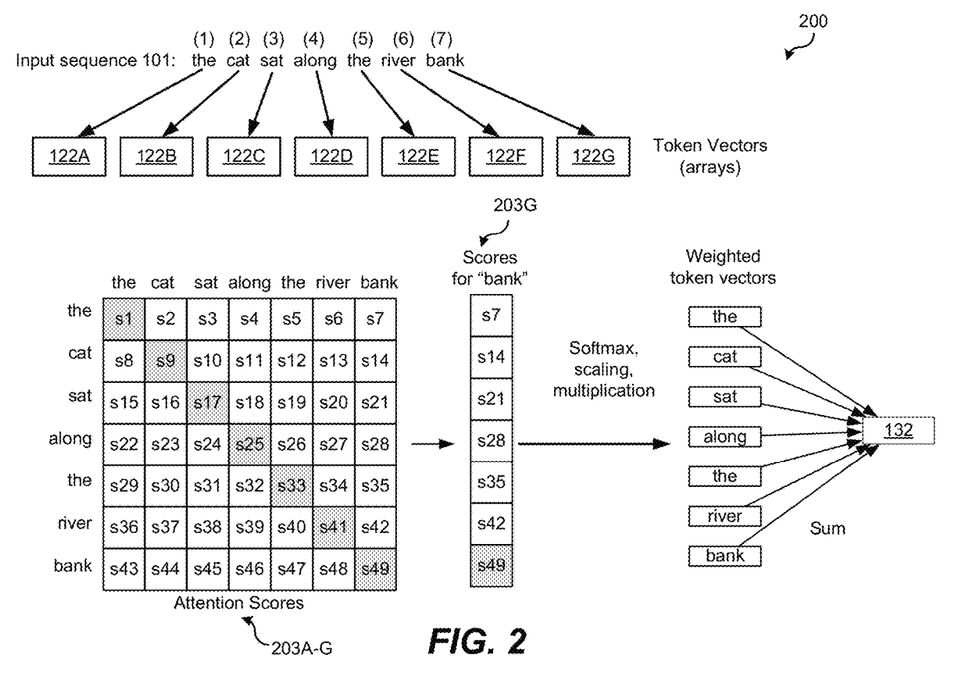
FIG. 2 illustrates a schematic example of a conceptual framework for attention.

To illustrate, reference will be made to FIG. 2, which illustrates a schematic example of a conceptual framework 200 for attention. The sentence "The cat sat along the river bank" includes seven words (or elements, which in natural language processing contexts is also referred to as "tokens"). The word "bank" can refer to a "financial bank," a "river bank," and so forth. Capturing this context may enable the neural network to focus attention on appropriate words relating to the context so that decision relating to, in this example, "river bank" may be made.

For each word in the input sentence, the embedding generator 120 may generate a respective token vector (which is also referred to as an embedding). Each token vector, or embedding, is an array of numbers that represent the word in the input sentence. Thus, as illustrated, an embedding is also referred to herein as an array 122.

In the illustrated example, the sentence "The cat sat along the river bank" will result in seven arrays 122A-G. Each array 122 may include a one-dimensional array of values. Each value may be a numeric value, such as ranging from 0 to 1 or other scale that can be normalized and processed by the attention subsystem 130 and/or the neural network model 114. It should be understood that because of this vectorization, other types of input sequences 101 that can be similarly vectorized, such as images, may be used. In these examples, instead of text embeddings, images may be vectorized based on image relationships such as bitmap location, colors, hue, and/or other image property that may relate neighboring pixels, voxels, or other image elements.

Returning to the example of text processing, after transforming each word in the input sentence into respective arrays 122, an attention mechanism may involve computing a matrix containing a set of attention scores 203A-G for respective arrays 122. Each attention score (illustrated as scores s1-s49) in a set of attention scores 203 is based on a comparison of the corresponding pair of words in the sentence. Put another way, each attention score (s1-s49) in a set of attention scores 203 may represent a level of relatedness of two words in the context of the input sentence. Each score s1-s49 may range in value from 0 to 1, in which words compared to itself in the matrix will be 1.0 (such as scores s1, s9, s17, s25, s33, s41, s49). For example, the set of attention scores 203G refers to the attention scores for the word "bank" compared to other words in the input sentence (including itself). In the illustrated example, the word "bank" will have attention scores: [s7, s14, s21, s28, s35, s42, s49] based on information both from its own embedding value (where the attention score s49 is 1.0) and from its relation with the surrounding context such as the other words in the sentence. By weighted summing up based on each array 122 and its attention score 203, attention constructs a context vector 132 in which a value is mapped to a word.

Query, Keys and Values

Attention may be conceptually depicted as a database query-retrieval process in which an attention process takes three inputs: a query, keys, and values and outputs a context vector. In this conceptual framework, a query is compared against keys and the result is then compared against values to generate resulting context vectors 132. The examples disclosed herein will use this conceptual framework to describe improved attention architectures (also referred to herein as a DA architecture or a SDA architecture) solely for illustration. The use of this conceptual framework does not otherwise limit the improved attention and systems and methods disclosed herein.

In the conceptual framework, each array 122 may serve as a query that is compared with each other array 122 (including itself) serving as a key to generate an attention score 203. An attention score 203 may be generated using a dot product between the key and a value. The attention score 203 may then be compared with an original array 122 serving as a value to generate a context vector 132, which is a weighted sum of values. In this example, the attention score 203 is used as the weight.

Referring again to FIG. 2, attention processing for the word "bank" will be described in the conceptual framework of query-key-value framework. This attention processing for "bank" will be repeated for each word. An embedding, or array 122G, may be generated for the word "bank." The array 122G will serve as a query that is compared against other arrays 122A-G (including itself) serving as keys. The comparison may result in an attention score 203G for the array 122G. Each array 122A-G will also serve as values that are weighted based on the corresponding attention score 203A-G. For example, the array 122G corresponding to the word "bank" will be weighted by the attention score 203G. Again, this process is repeated for each array 122 so that each array 122 is weighted by its corresponding attention score 203 to generate a context vector 132 that is a weighted sum of the based on the attention scores 203. In this way, the context vector 132 may enable the neural network model 114 to focus attention on important elements (such as characters or words of a sentence in a natural language context) of an input sequence 101.

Figure 3:
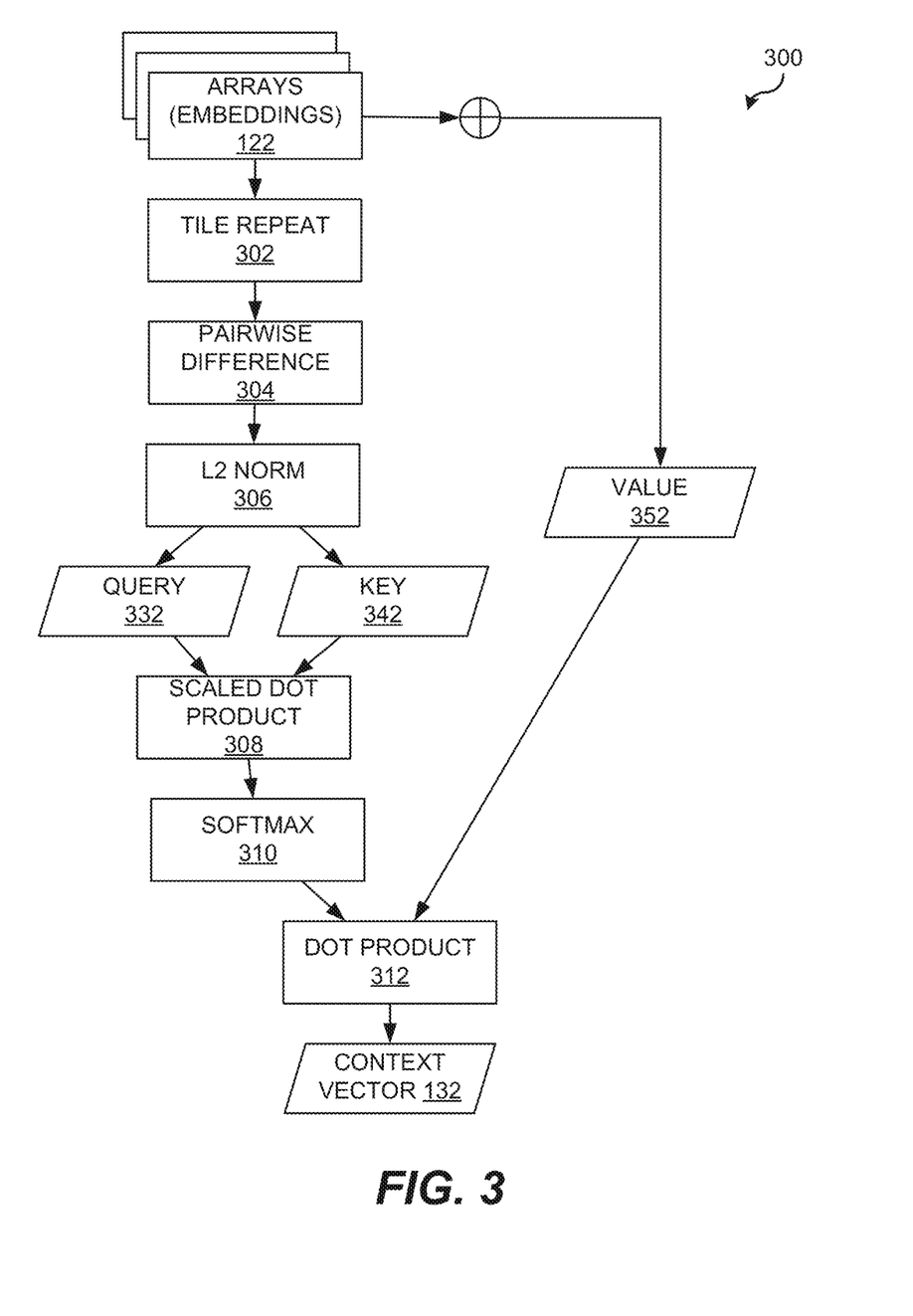
FIG. 3 illustrates an example of an improved attention architecture that includes a method of attention to generate a context vector for each array (such as a text embedding) in an input sequence.
Figure 5:
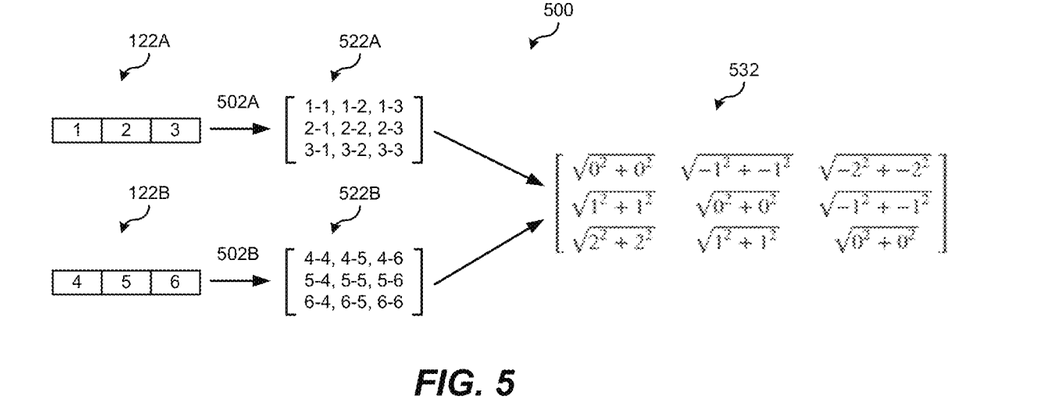
FIG. 5 illustrates a schematic example of generating difference matrices and difference values such as an L2 norm for preparing input arrays for attention.
Figure 6:
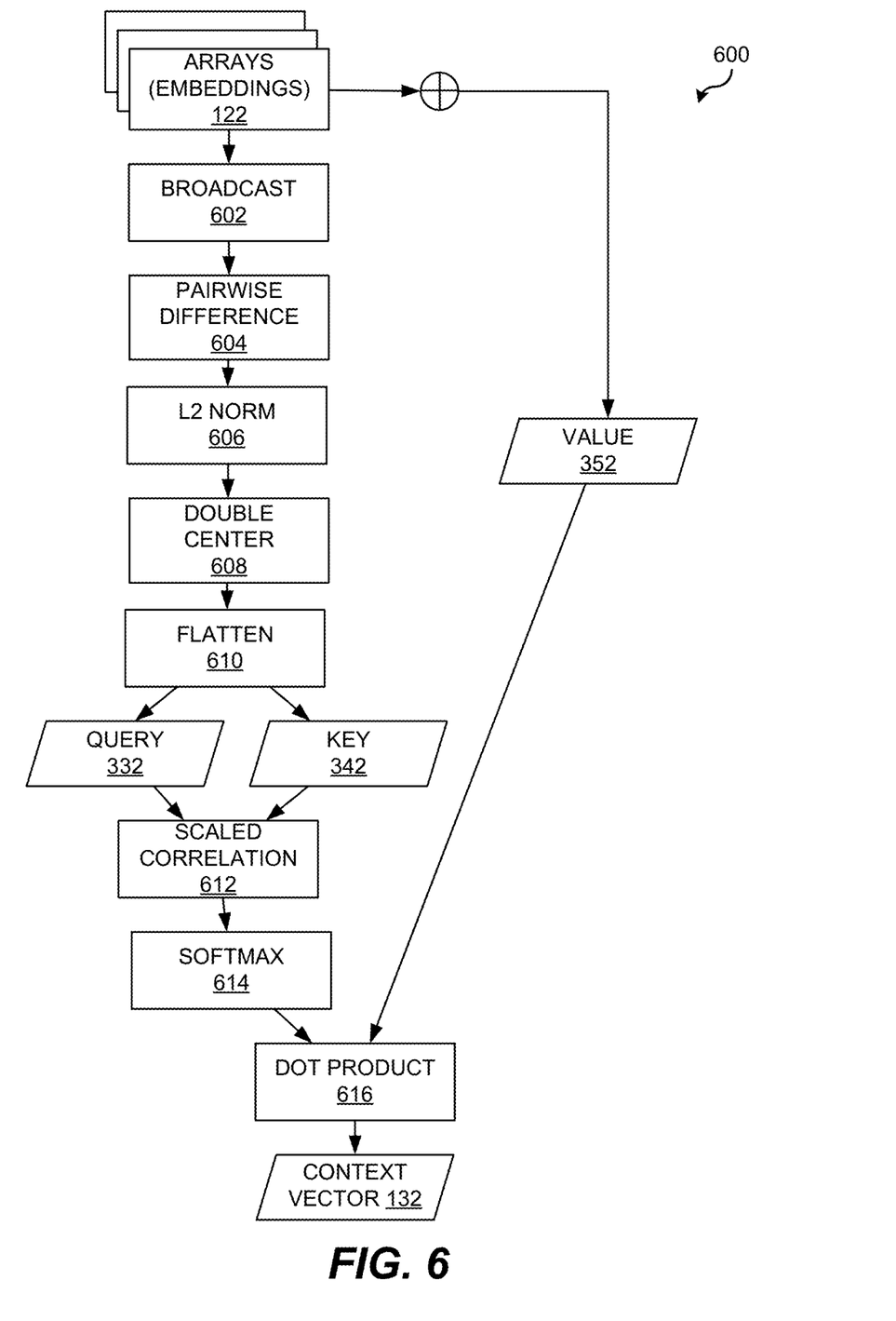
FIG. 6 illustrates an example of another improved attention architecture that includes a method of attention to generate a context vector for each array (such as a text embedding) in an input sequence.
Figure 7:
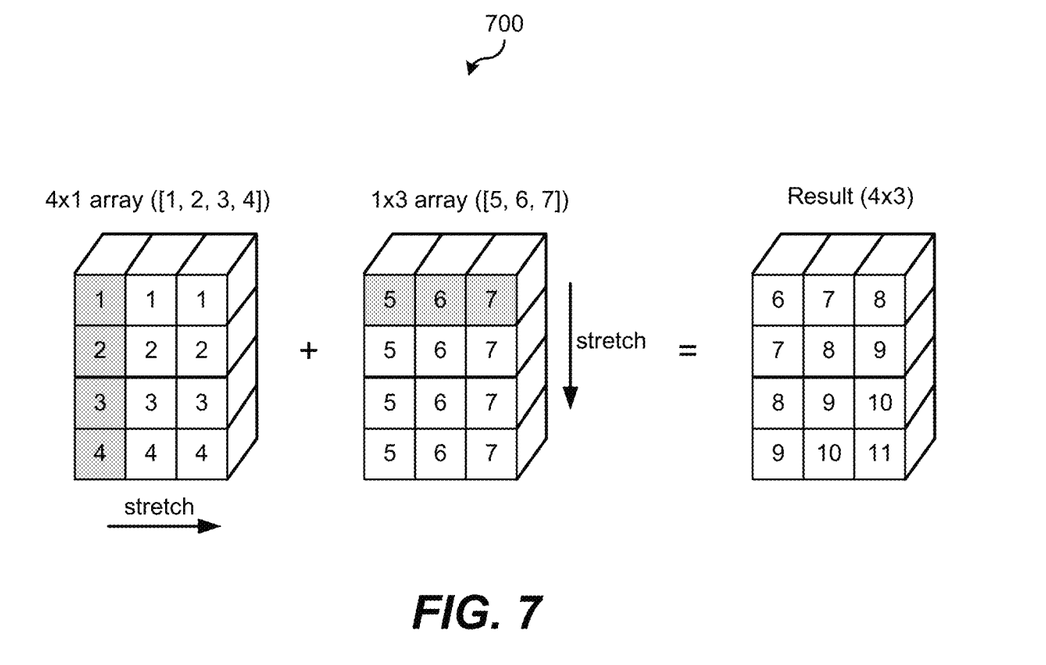
FIG. 7 illustrates a schematic example of a broadcast operation.
Figure 8:
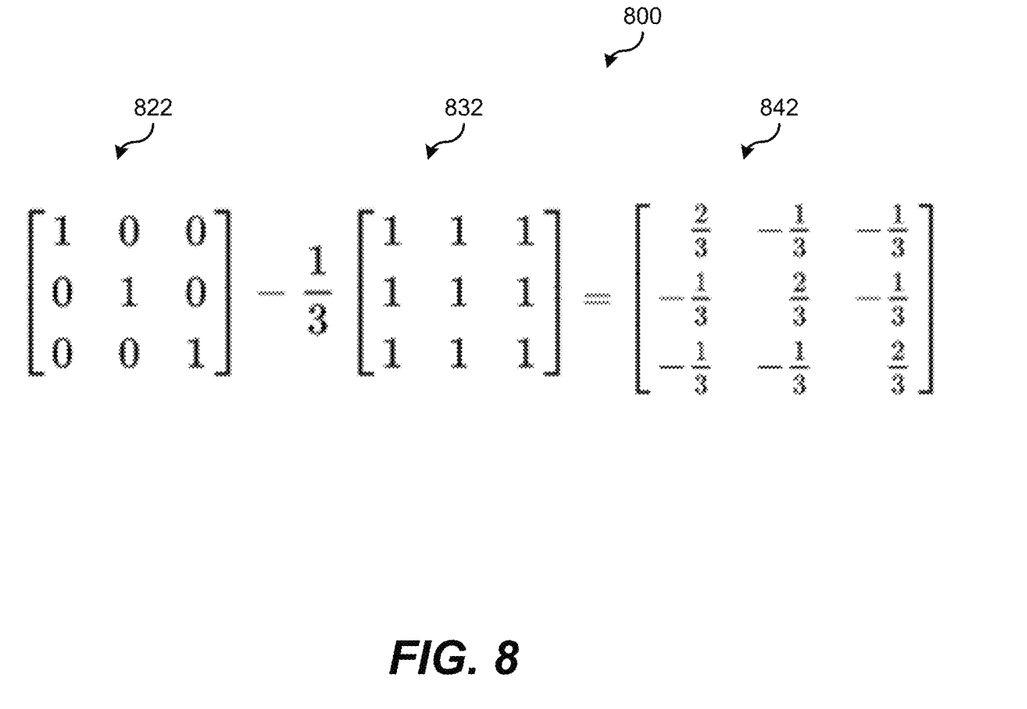
FIG. 8 illustrates a schematic example of a double center operation.
Figure 9:
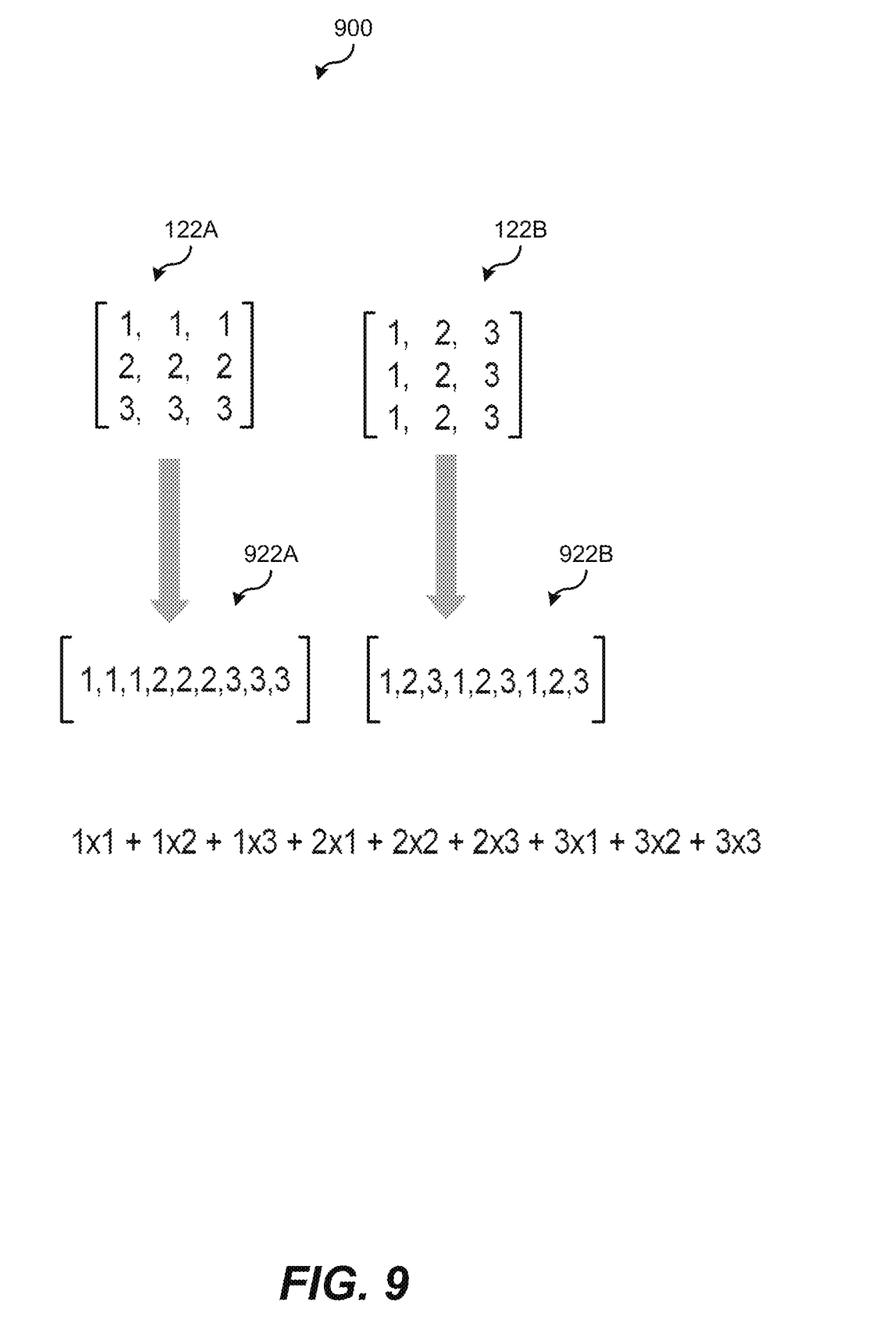
FIG. 9 illustrates schematic example of flatten and dot product operations to compute the squared sample distance covariance.

The attention subsystem 130 may implement different improved attention architectures, examples of which are illustrated at FIGS. 3 (and related FIGS. 4-5) and 6 (and related FIGS. 7-9). The improved attention architecture described in FIG. 3 may be referred to as SDA and the improved attention architecture described in FIG. 6 may be referred to as DA. The SDA and DA architectures may generate context vectors 132 that account for complex data that would otherwise result in loss of performance and/or increased complexity of the neural network model 114 that would otherwise burden memory and/or processing capacity. The improved attention may also be used in multi-headed attention that may serve as building blocks of modern transformers.

The context vectors 132 may be input to the downstream network 118 (such as one or more downstream layers of the neural network) for processing. The nature of the task performed by the neural network model 114 will vary depending on the particular implementation and training of the neural network model 114. For example, the neural network model 114 may be trained to generate a sentiment analysis based on the input sequence 101 (using attenuation from the attention subsystem 130), generate a summary of the content based on the input sequence 101, perform computer vision tasks such as image or character recognition based on the input sequence 101, and/or perform other deep learning tasks on the input sequence 101.

In some examples, the neural network model 114 may be trained as a classifier to generate one or more classifications. In these examples, the neural network model 114 may predict one or more classes for each of a plurality of classification models. In some examples, the neural network model 114 may predict an associated confidence score for each of the one or more predicted classes.

FIG. 3 illustrates an example of an improved attention architecture 300 that includes a method of attention to generate a context vector 132 for each array 122 (such as a text embedding) in an input sequence 101. FIG. 3 will be described with reference to FIGS. 1, 4, and 5 for illustration. The method may take as input a plurality of arrays 122 generated by the embedding generator 120. Each array 122 may be a text embedding of a word in a sentence or other sequence of characters or words. The method may be performed (specifically, at 302-312) for each array 122 from among the plurality of arrays 122 to generate a corresponding context vector 132. Thus, in a seven word sentence, seven arrays 122 will be processed by the method, resulting in seven context vectors 132. Each of the seven arrays 122 will serve as a query that is compared against all other arrays 122 (including itself) serving as keys.

Figure 4:
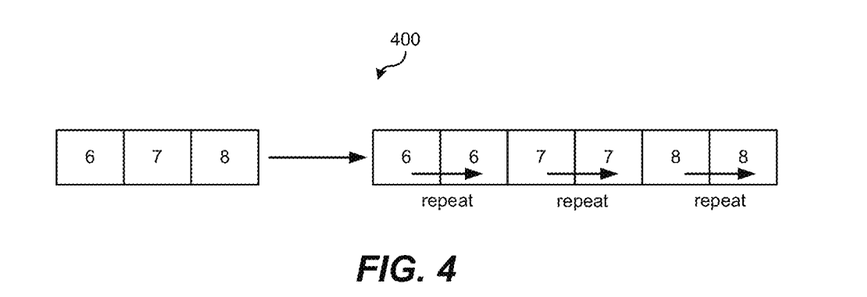
FIG. 4 illustrates a schematic example of array tile and repeat for preparing input arrays for attention.

At 302, the method may include performing a tile and repeat on each array 122. The tile and repeat may be used to determine pairwise differences on flattened arrays. The tile operation may concatenate arrays. For example, in an array [1,2,3], tiling twice would result in the array: [1,2,3,1,2,3]. The repeat operation will duplicate values. For example, in the array [6,7,8] then repeating twice would result in the array: [6,6,7,7,8,8], as illustrated in FIG. 4. The tile and/or repeat operations may facilitate efficient pairwise comparisons without reshaping the input arrays. The pairwise comparisons may facilitate the prevention of information loss in the attention mechanism due to taking difference of differences rather than differences between the input arrays.

At 304, the method may include determining a pairwise difference between at least a pair of arrays 122. To illustrate, referring to FIG. 5, the method may include determining differences within each array element against other array elements to generate a difference matrix. For example, the method may include comparing each array element in the array 122A having three array elements [1,2,3] to one another to generate the difference matrix 522A. The difference matrix 522B may be similarly generated based on the array 122B having three array elements [4,5,6]. It should be understood that only three array elements are shown for convenience. Other numbers of elements may be used, depending on the input data that is used. Furthermore, the arrays 122 being compared may be tiled and repeated as described at 302.

Assuming samples from two random variables $(X_k, Y_k)$, $k=1, 2, \ldots, n$, the pairwise differences may be obtained based on Equation 1:

$$a_{j,k} = \|X_j - X_k\|, j, k = 1, 2, \ldots, n, \qquad (1).$$
$$b_{j,k} = \|Y_j - Y_k\|, j, k = 1, 2, \ldots, n,$$

At 306, the method may include determining a difference value 532 based on the pair of arrays 122A and 122B. Referring again to FIG. 5, the difference value 532 may be a distance between the corresponding difference matrices 522A and 522B. The distance may be an L2 norm, also referred to as a Euclidean distance, or other norm between the difference matrices 522A and 522B. This difference value may be generated based on a Pythagorean formula as shown in FIG. 5. The difference value 532 may therefore represent a difference of differences between the arrays 122A and 122B.

A query 332 may be generated based on each array 122 and the difference value. The query 332 is conceptually searched against each key 334. Conceptually, each query 332 and each key 334 results from an array 122 that is processed at 302-306. In other words, each array 122 may be processed at 302-306 to generate a pre-processed array. For example, if there are seven arrays 122, 302-306 may generate seven pre-processed arrays. Each pre-processed array from among the seven pre-processed arrays serves as a query 332 that is searched (compared) against each of the seven pre-processed arrays (including itself) that serves as a key 334.

At 308, the method may include generating and scaling dot product values between each query 332 and key 335 pair. For example, a dot product between the query 332 and the key 335 may be scaled according to a scaling factor or weight, which may be learnable. At 308, the method may include transforming the scaled dot product values into a vector of probabilities. For example, the method may include transforming the scaled dot product values via Softmax, Hyperpersherical Prototype Networks (HPNs), Sigmoid function, Hyperbolic Tangent (Tanh) function, and/or other distribution techniques to generate the vector of probabilities.

At 312, the method may generate a context vector 132 based on the transformed values with each value 352. Each value 352 is an original array 122 that serves as a conceptual value that is weighted with the transformed values to generate the context vector 132. For example, the context vector 132 may be generated based on a dot product between the transformed values and the value 352.

FIG. 6 illustrates an example of an improved attention architecture that includes a method of attention to generate a context vector 132 for each array (such as a text embedding) 122 in an input sequence 101. FIG. 6 will be described with reference to FIGS. 1, 7, and 8 for illustration. The method may take as input a plurality of arrays 122 generated by the embedding generator 120. Each array 122 may be a text embedding of a word in a sentence or other sequence of characters or words. The method (specifically, 602-616) may be performed for each array 122 from among the plurality of arrays 122 to generate a corresponding context vector 132. Thus, in a seven word sentence, seven arrays 122 will be processed by the method, resulting in seven context vectors 132. Each of the seven arrays 122 will serve as a query that is compared against all other arrays 122 (including itself) serving as keys.

At 602, the method may include a broadcast operation on each array 122. FIG. 7 illustrates a schematic example 700 of the broadcast operation (also referred to as "broadcasting"). Broadcasting may reshape arrays for various reasons, such as to make a smaller array the same shape as a larger array. In this case, each array 122 may be broadcasted with respect to a paired array 122 to stretch each array across dimensions to result in larger datasets for pairwise differences: in the illustrated example, stretching to a 3×3 pairwise difference. This stretching permits appropriate entries to come together in the pairwise differences to further improve attention sensitivity.

At 604, the method may include determining a pairwise difference between at least a pair of arrays 122 after broadcasting each array in the pair of arrays 122. Determining the pairwise difference at 604 may be performed similar to 304 of FIG. 3 except that 604 operates after broadcasting instead of a tile repeat.

At 606, the method may include determining a difference value such as an L2 norm based on the pair of arrays 122A and 122B. Determining the difference value at 606 may be performed in the same way as described at 306 of FIG. 3.

At 608, the method may include performing a double center operation, which may also be referred to herein as "double centering." When comparing single axis arrays such as: [1,2,3], a centering operation may be performed in which the arrays are centered. To do so, the mean value of the array elements is subtracted from each element, making the array more comparable to other arrays. In particular, large and small numbers are avoided from comparison. Because the arrays 122 for improved attention disclosed herein may be transformed into multi-axes matrices, centering will occur in both (or more) axes. As such, centering at 608 is referred to as a double center operation. FIG. 8 illustrates a schematic example 800 of a double center operation. For example, matrix 822 has matrix elements having a mean value of ((1+1+1)/9)=⅓. Subtracting this mean value across all matrix elements (illustrated in 832) will result in the double centered matrix 842. The double centering operation may be based on Equation 2:

$$A_{j,k} := a_{j,k} - \overline{a}_{j.} - \overline{a}_{.k} + \overline{a}_{..} \quad (2)$$

$$B_{j,k} := b_{j,k} - \overline{b}_{j.} - \overline{b}_{.k} + \overline{b}_{..}$$

At 610, the method may include performing a flatten operation. FIG. 9 illustrates schematic example 900 of flatten and dot product operations to compute the squared sample distance covariance. As shown, a multi-dimensional (such as 2-dimensional) array 122A may be flattened into a lower-dimensional (such as 1-dimensional) array 922A. Likewise, a multi-dimensional (such as 2-dimensional) array 122B may be flattened into a lower-dimensional (such as 1-dimensional) array 922B. The dot product on the flattened array may be performed according to compute the squared sample distance covariance, such as based on Equation (3):

$$dCov_n^2(X, Y) := \frac{1}{n^2} \sum_{j=1}^{n} \sum_{k=1}^{n} A_{j,k} B_{j,k}, \quad (3)$$

in which:
n=number of elements in the arrays,
$A_{j,k}$ is a component of the first array 122A, and
$B_{j,k}$ is a component of the second array 122B.

A query 332 may be generated based on each array 122 and the difference value. The query 332 is conceptually searched against each key 334. Conceptually, each query 332 and each key 334 results from an array 122 that is processed at 602-610. In other words, each array 122 may be processed at 602-610 to generate a pre-processed array. For example, if there are seven arrays 122, 602-610 may generate seven pre-processed arrays. Each pre-processed array from among the seven pre-processed arrays serves as a query 332 that is searched (compared) against each of the seven pre-processed arrays (including itself) that serves as a key 334.

At 612, the method may include comparing each query 332 and key 335 pair based on a scaled correlation. For example, a correlation between the query 332 and key 335 may be generated. The correlation may include a Cosine similarity between the query 332 and key 335. The correlation may be scaled based on a scaling factor or weight, which may be learnable.

At 614, the method may include transforming the scaled query 332 and key 335 pair into a vector of probabilities. For example, the method may include transforming the scaled dot product values via Softmax, Hyperpersipherical Prototype Networks (HPNs), Sigmoid function, Hyperbolic Tangent (Tanh) function, and/or other distribution techniques to generate the vector of probabilities.

At 614, the method may generate a context vector 132 based on the transformed data with each value 352. Each value 352 is an original array 122 that serves as a conceptual value that is weighted with the transformed data to generate the context vector 132. For example, the context vector 132 may be generated based on a dot product between the scaled and transformed data from 602-614 and the value 352.

Figure 10:
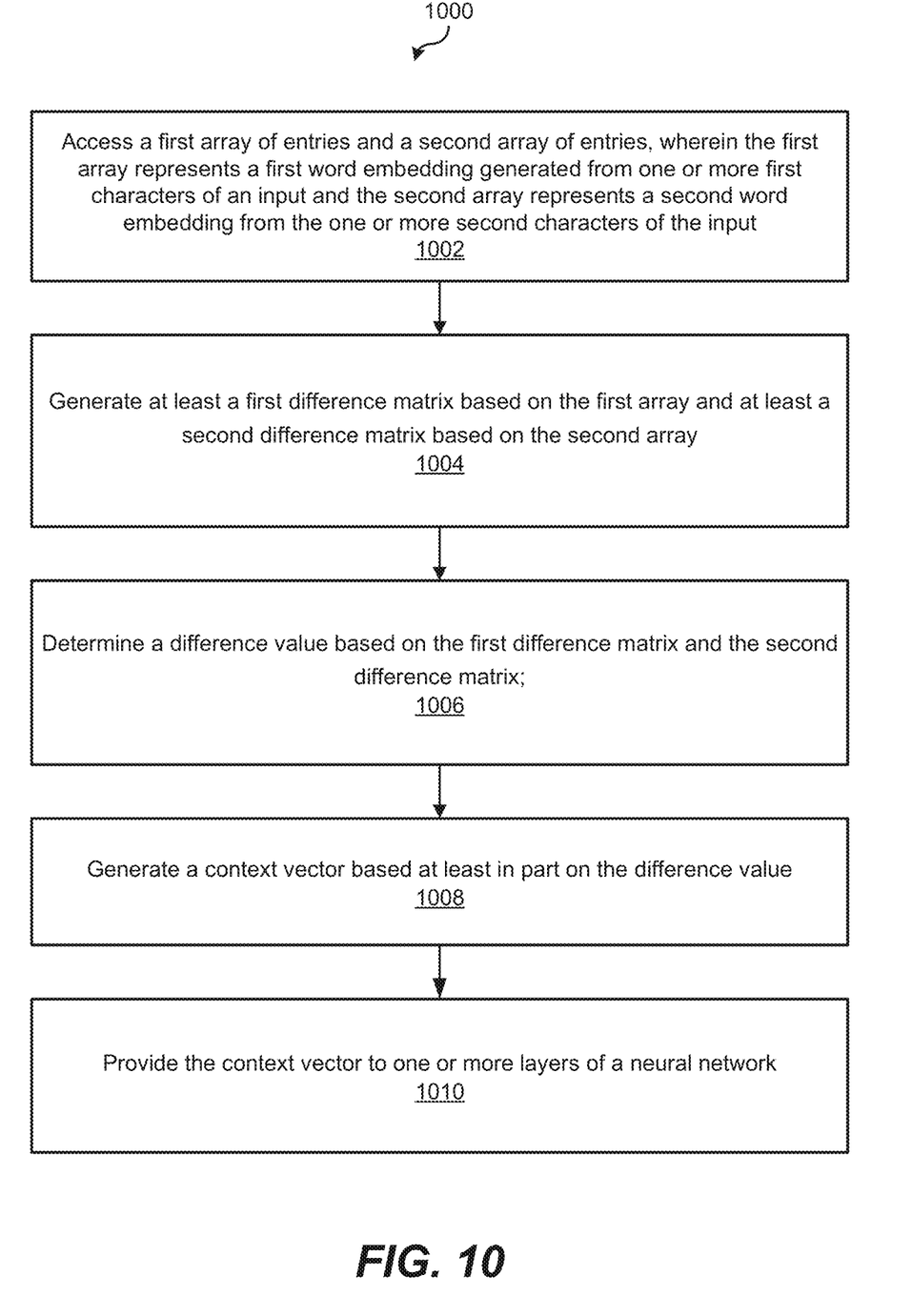
FIG. 10 illustrates an example of a method of performing improved attention for neural networks.

FIG. 10 illustrates an example of a method 1000 of performing improved attention for neural networks. The method 1000 may be implemented by the improved attention architectures 300 and/or 600 illustrated in FIGS. 3 and 6.

At 1002, the method 1000 may include accessing a first array of entries and a second array of entries. The first array may represent a first word embedding generated from one or more first characters (such as a word) of an input (such as an input sequence 101) and the second array represents a second word embedding from the one or more second characters (such as another word) of the input. Examples of the first and second arrays may respectively include array 122A and 122B generated by the embedding generator 120 based on the input sequence 101.

At 1004, the method 1000 may include generating at least a first difference matrix based on the first array and at least a second difference matrix based on the second array. Examples of the first and second different matrices may respectively include difference matrices 522A and 522B.

At 1006, the method 1000 may include determining a difference value based on the first difference matrix and the second difference matrix. An example of the difference value is the difference value 532, which may be a distance between the first and second difference matrices. At 1008, the method 1000 may include generating a context vector (such as the context vector 132) based at least in part on the difference value. At 1010, the method 1000 may include providing the context vector to one or more subsequent layers of a neural network (such as the neural network model 114). For example, when part of the neural network, the attention architecture (whether the SDA illustrated in FIG. 3 or the DA illustrated in FIG. 6) may provide the context vector to one or more downstream layers of the neural network.

The computer system 110 and the one or more client devices 160 may be connected to one another via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions to one or more of the client devices 160. The data conveying the predictions may be a user interface generated for display at the one or more client devices 160, one or more messages transmitted to the one or more client devices 160, and/or other types of data for transmission. Although not shown, the one or more client devices 160 may each include one or more processors, such as processor 112.

Each of the computer system 110 and client devices 160 may also include memory in the form of electronic storage. The electronic storage may include non-transitory storage media (also referred to as medium) that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for facilitating attention for neural networks, the method comprising:
    accessing a first array of entries and a second array of entries,
    wherein the first array represents a first word embedding generated from one or more first characters of an input and the second array represents a second word embedding from one or more second characters of the input;
    generating at least a first difference matrix based on the first array and at least a second difference matrix based on the second array;
    determining a difference value based on the first difference matrix and the second difference matrix;
    wherein the difference value comprises at least one of a distance covariance or a distance correlation;
    generating a context vector based at least in part on the difference value; and
    providing the context vector to one or more subsequent layers of a neural network.

2. The method of claim 1 further comprising predicting one or more classes for each of a plurality of classification models using the neural network.

3. The method of claim 2 further comprising predicting an associated confidence score for each of the one or more predicted classes.

4. The method of claim 1, wherein generating the first difference matrix based on the first array and the second difference matrix based on the second array comprises:
    expanding the dataset of each of the first array and the second array;
    calculating a first pairwise difference of the first difference matrix; and
    calculating a second pairwise difference of the difference matrix.

5. The method as in claim 4, wherein expanding the dataset of each of the first array and the second array comprises one of tiling or repeating each entry in each array.

6. The method of claim 4, wherein expanding the dataset of each of the first array and the second array comprises broadcasting each array.

7. The method of claim 4, wherein generating the first difference matrix based on the first array and the second difference matrix based on the second array comprises:
    for each first element in the first array, determining a difference between the first element and each of the other first elements in the first array to generate the first difference matrix; and
    for each second element in the second array, determining a difference between the second element and each of the other second elements in the second array to generate the second difference matrix.

8. The method of claim 1, wherein determining the difference value based on the first difference matrix and the second difference matrix comprises: computing the L2 norm of the first difference matrix and the second difference matrix.

9. The method of claim 6, further comprising centering and flattening each of the first difference matrix and the second difference matrix.

10. The method of claim 1, wherein determining the difference value based on the first difference matrix and the second difference matrix comprises: generating one of a dot product of the first difference matrix and the second difference matrix and a scaled correlation of the first difference matrix and the second difference matrix.

11. A system, comprising:
a processor programmed to:
access a first array of entries and a second array of entries, wherein the first array represents a first word embedding generated from one or more first characters of an input and the second array represents a second word embedding from the one or more second characters of the input;
generate at least a first difference matrix based on the first array and at least a second difference matrix based on the second array;
determine a difference value based on the first difference matrix and the second difference matrix, wherein the difference value comprises at least one of a distance covariance or a distance correlation;
generate a context vector based at least in part on the difference value; and
provide the context vector to one or more subsequent layers of a neural network.

12. The system of claim 11, wherein the processor is further programmed to predict one or more classes for each of a plurality of classification models using the neural network.

13. The system of claim 12, wherein the processor is further programmed to predict an associated confidence score for each of the one or more predicted classes.

14. The system of claim 11, wherein to generate the first difference matrix based on the first array and the second difference matrix based on the second array, the processor is programmed to:
expand the dataset of each of the first array and the second array;
calculate a first pairwise difference of the first difference matrix; and
calculate a second pairwise difference of the difference matrix.

15. The system as in claim 14, wherein to expand the dataset of each of the first array and the second array, the processor is further programmed to: tile or repeat each entry in each array.

16. The system of claim 14, wherein to expand the dataset of each of the first array and the second array, the processor is programmed to broadcast each array.

17. The system of claim 14, wherein to generate the first difference matrix based on the first array and the second difference matrix based on the second array, the processor is further programmed to:
for each first element in the first array, determine a difference between the first element and each of the other first elements in the first array to generate the first difference matrix; and
for each second element in the second array, determine a difference between the second element and each of the other second elements in the second array to generate the second difference matrix.

18. The system of claim 11, wherein to determine the difference value based on the first difference matrix and the second difference matrix, the processor is further programmed to:
compute the L2 norm of the first difference matrix and the second difference matrix.

19. The system of claim 16, wherein the processor is further programmed to: center and flatten each of the first difference matrix and the second difference matrix.

20. A non-transitory computer readable medium storing instructions that, when executed by a processor, programs the processor to:
access a first array of entries and a second array of entries, wherein the first array represents a first word embedding generated from one or more first characters of an input and the second array represents a second word embedding from the one or more second characters of the input;
generate at least a first difference matrix based on the first array and at least a second difference matrix based on the second array;
determine a difference value based on the first difference matrix and the second difference matrix, wherein the difference value comprises at least one of a distance covariance or a distance correlation;
generate a context vector based at least in part on the difference value; and
provide the context vector to one or more subsequent layers of a neural network.

* * * * *